United States Patent [19]

Kabayama et al.

[11] Patent Number: 4,903,807
[45] Date of Patent: Feb. 27, 1990

[54] RELEASE BEARING MECHANISM OF A CLUTCH

[75] Inventors: Yoshiaki Kabayama, Hirakata; Hiroshi Takeuchi, Osaka, both of Japan

[73] Assignee: Kabushiki Kaisha Daikin Seisakusho, Osaka, Japan

[21] Appl. No.: 270,371

[22] Filed: Nov. 8, 1988

Related U.S. Application Data

[63] Continuation of Ser. No. 38,120, Apr. 14, 1987, abandoned.

[30] Foreign Application Priority Data

Apr. 18, 1986 [JP] Japan ................... 61-90834

[51] Int. Cl.⁴ ................... F16D 23/14
[52] U.S. Cl. ................... 192/98; 192/89 B; 192/110 B
[58] Field of Search ........... 192/70.13, 89 B, 98, 192/110 B, DIG. 1

[56] References Cited

U.S. PATENT DOCUMENTS

| | | | |
|---|---|---|---|
| 4,502,583 | 3/1985 | Limbacher | 192/98 |
| 4,560,053 | 12/1985 | Lassiaz | 192/98 |
| 4,588,061 | 5/1986 | Mallet | 192/98 |
| 4,632,237 | 12/1986 | Maycock et al. | 192/98 |
| 4,646,898 | 3/1987 | Muller | 192/98 |
| 4,648,499 | 3/1987 | Despres et al. | 192/98 |

Primary Examiner—Leslie A. Braun
Assistant Examiner—Richard M. Lorence
Attorney, Agent, or Firm—Armstrong, Nikaido, Marmelstein, Kubovcik & Murray

[57] ABSTRACT

A release bearing mechanism of a clutch comprises a release bearing connected to an operation mechanism for applying an operating force to the bearing in axially outward direction, and including an inner race which is provided with an axially inwardly extending cylindrical extension. A cylindrical wedge collar is disposed around the extension. A lever plate is connected to a diaphragm spring of the clutch and disposed around the wedge collar. The wedge collar and the lever plate are movable through predetermined axial section relatively to each other. The wedge collar includes an inner engagement portion axially immovably engaging the cylindrical extension, an outer engagement portion engaging the lever plate and radially elastically deflectable portion, so that radially outward deflection of the deflectable portion may permit radial movement of the inner engagement portion to a disengaged position and that radially inward deflection thereof may permit radial movement of the outer engagement portion to a disengaged position.

5 Claims, 3 Drawing Sheets

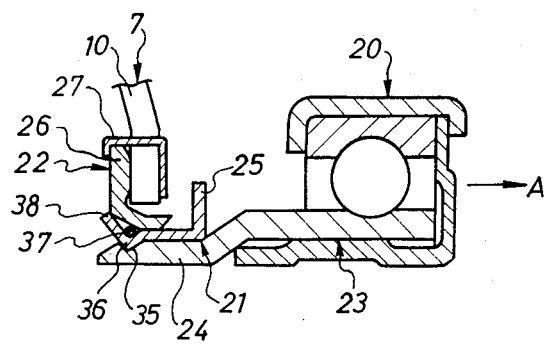
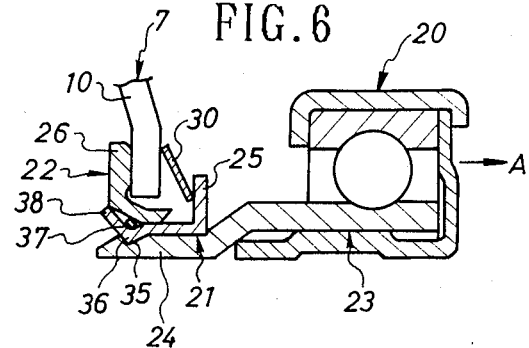
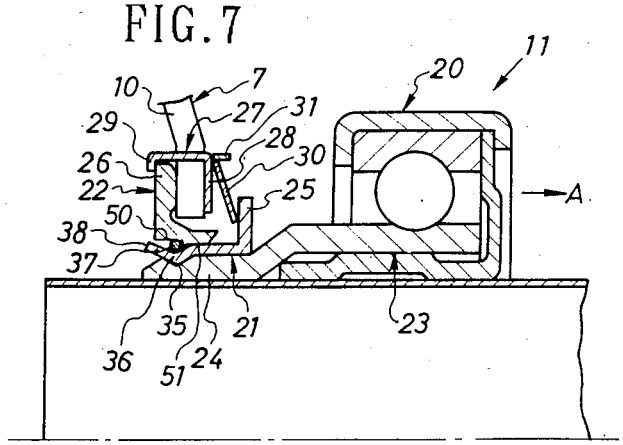

RELEASE BEARING MECHANISM OF A CLUTCH

This application is a continuation of application Ser. No. 038,120 filed Apr. 14, 1987 now abandoned.

BACKGROUND OF THE INVENTION

The present invention relates to a release bearing mechanism of a friction clutch used in an automobile and others, and particularly, of a clutch of pull-type, which is adapted to pull the diaphragm spring by the release bearing mechanism for releasing the clutch.

The diaphragm spring is, as well known, a member for biasing a pressure plate toward a friction facing of a clutch disc. The clutch of the pull type is released when an axially outward bearing mechanism pulls the inner periphery of the diaphragm spring away from the clutch disc.

An example of the release bearing mechanism for the pull type clutch is disclosed in Japanese Patent Application No. 59-197623 (French Patent Application No. 83 058 848). In this mechanism, a cylindrical connecting member is provided at an inner periphery of the diaphragm spring, and an extension of an inner race of a release bearing is fitted into the connecting member. The connecting member and the extension are connected by means of a ring member similar to a snap ring.

In this structure, the release bearing and the diaphragm spring can be assembled and disassembled by removing and re-attaching the ring member.

In the above structure, because the connecting member and the inner race are connected only through the ring member, large load is applied to the ring member in the clutch engaging operation. Further, because the ring member can not be stably fitted to the inner periphery of the connection member and/or the outer periphery of the inner race without a radial gap, the ring member may radially move or deviate with respect to the inner race and/or the connection member, in which case, partially excessive load may be applied to the ring member, resulting in breakage thereof.

Accordingly, it is an object of the invention to provide an improved structure, overcoming the above-noted disadvantages.

Other object of the invention is to provide a structure, in which assembly and disassembly can be performed facilely.

SUMMARY OF THE INVENTION

According to the invention, a release bearing mechanism of a clutch comprises a release bearing connected to an operation mechanism for applying an operating force to the bearing in a direction axially and outward of the clutch, and including an inner race which is provided with axially inwardly extending cylindrical extension. A cylindrical wedge collar is disposed around the extension. A lever plate is connected to a diaphragm spring of the clutch and disposed around the wedge collar. The wedge collar and the lever plate are movable through predetermined axial section relatively to each other, and provided at an axially outer and inner portions with radially outward projections located at opposite sides of the diaphragm spring, respectively.

The wedge collar includes an inner engagement portion axially immovably engaging the cylindrical extension, an outer engagement portion axially engaging the lever plate from the axially inner side of the plate, and radially elastically deflectable portion, so that radially outward deflection of the deflectable portion may permit radial movement of the inner engagement portion thereof may permit radial movement of the outer engagement portion to a disengaged position.

The extension of the inner race is operable to prevent the radially inward deflection of the wedge collar when the extension engages the inner engagement portion.

The lever plate is operable at an axially inner position in the movable section to prevent the radially outward deflection of the wedge collar and operable at an axially outward position to permit the radially outward deflection of the wedge collar.

According to the structure of the present invention, when the operation mechanism moves the release bearing axially outwardly for releasing the clutch, the wedge collar and the lever plate move in the same direction, so that the inner periphery of the diaphragm spring is pulled or moved axially outwardly.

In an assembly operation of the mechanism, the wedge collar is engaged with the lever plate before the the wedge collar is fitted around the extension of the inner race, i.e., while the wedge collar is radially inwardly deflectable. Then, the wedge collar is shifted axially inwardly with respect to the lever plate for permitting radially outward deflection, and the wedge collar is fitted to the extension of the inner race. Disassembly is performed in sequence reverse to that of the above assembly.

Other and further objects, features and advantages of the invention will appear more fully from the following description of the preferred embodiments of the invention.

BRIEF DESCRIPTION OF THE DRAWINGS

FIG. 5 is a fragmentary schematic sectional view of other embodiment;

FIG. 6 is a fragmentary schematic sectional view of another embodiment; and

FIG. 7 is a fragmentary schematic sectional view of still another embodiment.

DETAILED DESCRIPTION OF THE PREFERRED EMBODIMENTS

Figure 2:
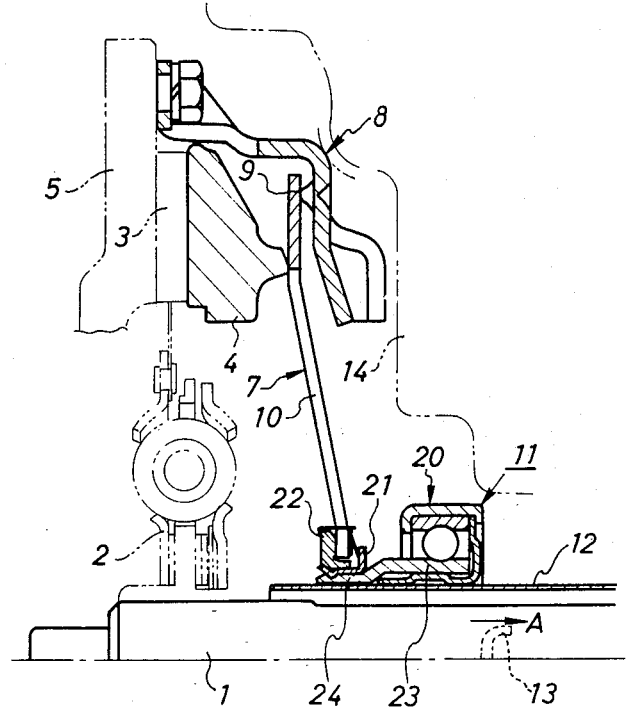
FIG. 2 is a fragmentary sectional view of a clutch including the mechanism in FIG. 1.

In a clutch as best illustrated in FIG. 2, an output shaft 1 is connected to a clutch disc 2 provided at a radially outer portion with friction facing 3, which is adapted to be pressed axially of shaft 1 by a pressure plate 4 onto a flywheel 5 to engage the clutch. An annular diaphragm spring 7 is disposed at the rear side of the pressure plate 4 for biasing the pressure plate axially of shaft 1 toward the friction facing 3. The diaphragm spring 7 at the relatively radially outer portion is connected to the pressure plate 4, and is supported at its rear surface of the outer peripheral portion by a fulcrum 9 of a clutch cover 8 fixed to the flywheel 5.

The diaphragm spring 7 is provided at its radially inner and middle portion with radial slits 10 (only one of which is illustrated), and is connected at the inner peripheral portion to a release bearing mechanism 11. The release bearing mechanism 11 is axially slidably fitted around a sleeve 12 disposed around the output shaft 1, and is connected to an operation mechanism 13. The operation mechanism 13 is supported by a clutch housing 14, and is connected to a clutch pedal (not shown). An end of clutch housing 14 opposite to the flywheel 5 is fixed to a transmission housing (not shown).

Figure 1:
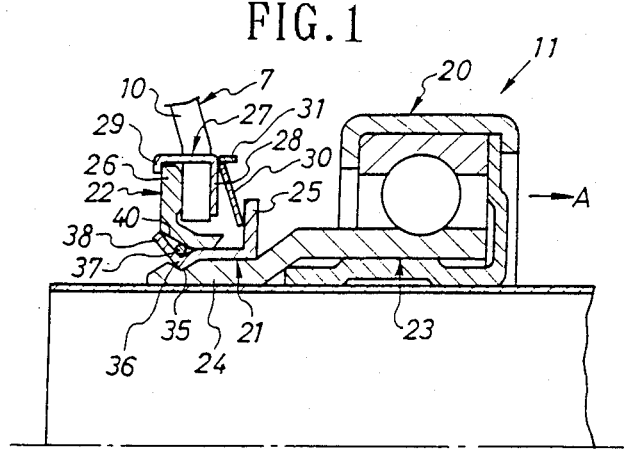
FIG. 1 is a fragmentary sectional view of an embodiment of the invention.

When the clutch pedal is depressed, the operation mechanism 13 moves the release bearing mechanism 11 axially of shaft 1 and from clutch 2 as indicated by an arrow A in FIG. 1, so that the release bearing mechanism 11 pulls the inner periphery of the diaphragm spring 7 axially of shaft 1 and outwardly of shaft 1 to release or disengage the clutch.

The release bearing mechanism 11 includes a bearing 20, a wedge collar 21 and a lever plate 22. As will be detailed later, in the assembly stage, the wedge collar 21 and the lever plate 22 are preassembled and fixed to the diaphragm spring 7 to form a part of an assembled structure at the flywheel side of bearing 20 together with the diaphragm spring 7 and the clutch cover 8. The bearing 20 is assembled and fixed together with the sleeve 12 and the operation mechanism 13 to the clutch housing 14 to form a part of an assembled structure at the transmission side together with the clutch housing 14. These structures are coaxially joined and fixed together, after they are independently assembled.

Referring to FIG. 1, the bearing 20 is located axially of sleeve 12 outside (righthand in FIG. 1) the inner periphery of the diaphragm spring 7. An inner race 23 of the bearing 20 has an integral cylindrical extension 24, which is projected axially inwardly into the inner periphery of the diaphragm spring 7. The outer peripheral surface of the extension 24 is fitted into the wedge collar 21. The wedge collar 21 is a substantially cylindrical member, and is integrally provided at the axially outer end with a radially outward projector or flange 25. Lever plate 22 is fitted onto a cylindrial outer peripheral surface of the wedge collar 21, and is integrally provided at the axially inner end with radially outward projector or flange 26. The projections or flanges 25 and 26 are located at positions axially outside and inside the diaphragm spring 7, respectively.

Flange 26 is axially immovably connected to the diaphragm spring by a support plate 27, which includes an annular body 28 and a plurality of bent projections 29 integrally provided at the outer periphery of the body 28, the body 28 is seated on the axially outer surface of the inner peripheral portion of the diaphragm spring 7. The projections 29 extend from the body 28 through the slits 10 in the diaphragm spring 7 to the outer periphery of the flange 26, and are bent at the ends thereof to engage the axially inner surface of the flange 26, respectively.

In the assembled condition in FIG. 1, an axial space is formed between the flange 25 and the annular body 28. A conical spring 30 is disposed in the above space so as to bias the wedge collar 21 axially outwardly with respect to the diaphragm spring 7 and the lever plate 22. Thus, the wedge collar 21 is movable through a predetermined axial section relatively to the lever plate 22, but is prevented from axially rattling. The body 28 is integrally provided at the outer periphery with projections 31, which are bent axially outwardly and engage the outer periphery of the conical spring 30.

Extension 24 is provided at the outer peripheral surface of the end portion with a groove 35 having a substantially V-shaped section, The wedge collar 21 includes a first or inner engagement portion 36 which engages the groove 35. The engagement portion 36 is formed by a bent portion of the collar 21 which is projected radially inwardly to have a substantially V-shaped section. The portion 36 is annularly and continuously formed in the collar 21.

The outer peripheral surface of the engagment portion 36 forms an annular groove, into which a snap ring 37 is fitted. An end portion 38 of the wedge collar 21 is projected axially inwardly beyond the snap ring 37 and is enlarged into a tapered shape. This prevents the snap ring 37 from dropping axially inwardly from the wedge collar 21.

Lever plate 22 is provided at the inner periphery of the axially inner portion with tapered guide surface 40 adjacent and opposed to the tapered end portion 38. In the operating condition in FIG. 1, the guide surface 40 is engaged with the snap ring 37 and the outer peripheral surface of the end portion 38, i.e., with an outer or second engagement portion. Further, in this condition, the inner periphery of the flange 25 is in contact axially with a inclinedly stepped portion provided at the outer periphery of the inner race 23.

Figure 4:
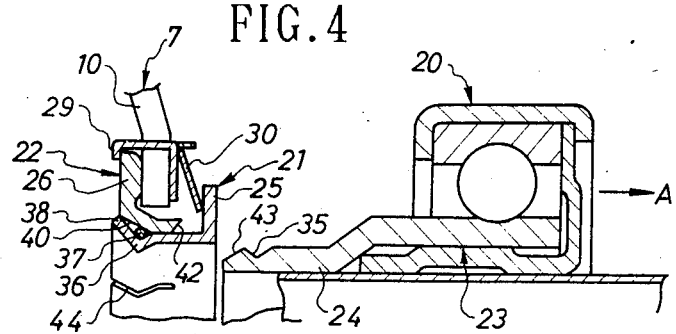
FIG. 4 is a fragmentary schematic sectional view of the disassembled mechanism.

Referring to FIG. 4, the wedge collar 21 is provided with circumferentially spaced slots or slits 44, which extend from the axially inner edge of the wedge collar 21 to an axially middle portion thereof. This permits elastic deflection of the wedge collar 21 for facilely shifting the engagement portion 36 and the end portion 38 radially outwardly and inwardly.

In the operating condition in FIG. 1, the end of the inner race extension 24 engages the wedge collar 21, so that the end portion 38 is prevented from moving radially inwardly and, thus, from disengaging from the lever plate 22. Furher, the lever plate 22 engaging the outer peripheries of the snap ring 37 and the engagement portion 36 prevents the engagement portion 36 from deflecting radially outwardly and, thus, from disengaging from the groove 35. Therefore, when the bearing 20 is axially shifted by the operation mechanism 13, the wedge collar 21 and the lever plates 22 move in the same direction to move the radially inner portion of the diaphragm spring 7. Thus, the engaged or disengaged condition of the clutch is controlled.

Figure 3:
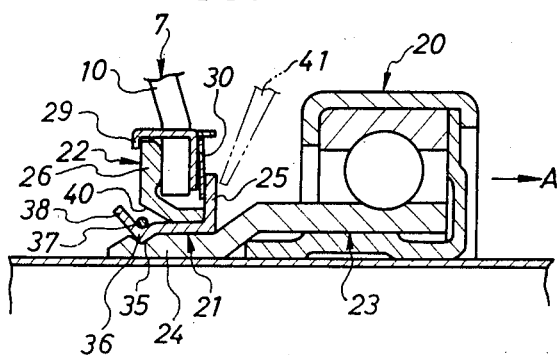
FIG. 3 is a fragmentary schematic sectional view illustrating middle stage of disassembly process.

An disassembly operation can be performed as follows. As a first step, the bearing 20 is pushed axially inwardly with respect to the diaphragm spring 7. Whereby, the wedge collar 21 moves together with the bearing 20 to a position illustrated in FIG. 3. In the condition in FIG. 3, the lever plate 22 is located at axially outermost position with respect to the wedge collar 21 while compressing the conical spring 30, and the guide surface 40 and the portion adjacent thereto are located at a position nearly axially outside the end portion 38 and the snap ring 37, in which the surface 40 and the adjacent portion do not prevent the radially outward deflection of the engagement portion 36. Then, the axially outer surface of the flange 25 is supported by an appropriate tool 41, and the bearing 20 is pulled axially outwardly. The engagement portion 36 is pushed radially outwardly by the inclined surface of the groove 35 to disengage from the groove 35, and the bearing 20 is withdrawn from the wedge collar 21.

In the subsequent disassembly of the wedge collar 21 from the lever plate 22, the wedge collar 21 is pulled axially outwardly with respect to the lever plate 22. Since the inner race 23 is removed from the wedge collar 21, the nd portion 38 and the snap ring 37, i.e., the outer of second engagement portion, can elastically deflect radially inwardly. Thus, when the wedge collar 21 is pulled, the end portion 38 and the snap ring 21 are guided and moved radially inwardly by the guide surface 40, so that the wedge collar 21 is disengaged from the lever plate 22.

An assembly operation is performed in the sequence opposite to that of the disassembly operation. That is; the wedge collar 21 is fitted to the inner race 23 after the wedge collar 21 is engaged with the lever plate 22. In the engaging operation of the wedge collar 21 to the lever plate 22, the end portion 38 initially contacts the inner peripheral portion of the end of the lever plate 22 and is deflected radially inwardly. The lever plate 22 is provided at the above inner peripheral portion of its end with a tapered guide surface 42 (FIG. 4) for facilitating radially inward deflection. In the subsequent fitting operation of the extension 24 into the wedge collar 21, the radially outward projection 43 at the outer end of the extension 24 initially contacts and deflects the engagement portion 36 radially outwardly. The extension 24 is provided at the outer peripheral portion of its end with a tapered guide surface 43 for facilitating the deflection.

According to the invention, as described hereinabove, the inner race 23 of the release bearing 20 is fitted into the wedge collar 21, which engages the lever plate 22 connected to the diaphragm spring 7. The inner and outer engagement portions of the wedge collar 21, which engage the inner race 23 and the lever plate 22, are radially oppositely supported by the lever plate 22 and the inner race 23, respectively. Therefore, these members are radially stably and rigidly engaged together, resulting in a higher connecting strength, compared with conventional connecting structure using only one radially unstable ring.

Further, because the bearing 20, wedge collar 21 and lever plate 22 can be assembled and disassembed by axially relatively shifting, the assembly and disassembly operation can be facilely performed.

Particularly, in the illustrated structure employing the support plate 27 (connecting member), since it is not necessary to support the lever plate 22 by a tool, the disassembly operation can be performed very facilely.

In the embodiment illustrated in FIG. 1, in which the operation mechanism 13 is connected to the clutch pedal only through a mechanical means or mechanism, the conical spring 30 is used for engaging the wedge collar 21 with the lever plate 22. However, in some of the conventional clutch mechanism, hydraulic pressure is used to operate the operation mechanism 13. In those clutches, hydraulic preload is constantly applied to the operation mechanism 13 in the axially outward direction even when the clutch pedal is not opeated, so that the wedge collar 21 is held together with the bearing 20 at the axially outer position with respect to the lever plate 22. Therefore, in these hydraulic clutch, the conical spring 30 may be eliminated, as illustrated in FIG. 5.

As illustrated in FIG. 6, the support plate 27 (FIG. 1) may be eliminated. In this case, the lever plate 22 is supported by an appropriate tool (not shown) to contact the diaphragm spring 7 in the disassembly operation.

The outer or second engagement portion, which is formed by the snap ring 37 and the tapered end portion 38 in the embodiment in FIG. 1, may be formed only by the snap ring, as illustrated in FIG. 7. In FIG. 7, only the snap ring 37 axially engages the lever plate 22. The tapered end portion 38 has a relatively small outer diameter at its end. The lever plate 22 is provided at its axially inner portion with cylindrical inner peripheral surface 50 of a relatively large diameter, so that an annular stepped portion engaging the snap ring 37 is formed between said surface 50 and a cylindrical inner peripheral surface 51 of a relatively small diameter formed at the axially outer portion.

Although the invention has been described in its preferred form with a certain degree of particularlity, it is understood that the structure of the preferred form may be changed in the details of construction, and that the combination and arrangement of parts may be modified to without departing from the spirit and scope of the invention as hereinafter claimed.

What is claimed is:

1. A release bearing mechanism of a clutch comprising:
    a release bearing connected to an operation mechanism for applying an operating force to the bearing in a direction axially outwardly of the clutch, and including an inner race which is provided with a cylindrical extension in a direction axially inwardly of the clutch;
    a cylindrical wedge collar disposed around said cylindrical extension; and
    a lever plate connected to a diaphragm spring of the clutch and disposed around the wedge collar;
    said wedge collar and said lever plate being movable through a predetermined axial distance relative to each other, said wedge collar being provided at an axially outer portion with a radially outward projection, said lever being provided at an axially inner portion with a radially outward projection, said radially outward projections being located at opposite sides of said diaphragm spring;
    an axially inner portion of said wedge collar including a radially elastically deflectable portion with an inner engagement portion engaging a groove formed on the outer peripheral surface of an axially inner end portion of said cylindrical extension of said inner race, so that radially outward deflection of said deflectable portion permits radial movement of said inner engagement portion to a position disengaged with said groove and that radially inward deflection thereof permits radial movement of said inner engagement portion to a position engaged with said groove;
    said cylindrical extension of said inner race being operable to prevent radially inward deflection of said deflectable portion when said cylindrical extension engages said inner engagement portion;
    said lever plate being operable at an axially inner position in said axial movable distance to prevent radially outward deflection of said deflectable portion and operable at an axially outer position in said axial movable distance to permit radially outward delfection of said deflectable portion; and
    said axially inner end portion of said wedge collar being tapered to form an enlarged outer portion, and a snap ring is fitted around a groove formed on an outer periphery of said engagement portion.

2. A release bearing mechanism of claim 1 wherein said inner engagement portion is formed by a radially inwardly projected portion of said wedge collar, which is engageable with a groove formed at the outer periphery of said extension of said inner race.

3. A release bearing mechanism of claim 1 wherein a snap ring is fitted around a portion adjacent to the axially inner portion of th wedge collar.

4. A release bearing mechanism of claim 1 wherein said lever plate and said diaphragm spring are connected axially immovably with respect to each other by a connecting member.

5. A release bearing mechanism of claim 4 wherein said connecting member is a support plate which extends through radial slits of the diaphragm spring and connects said lever plate and said diaphragm spring.

* * * * *